D. HERSHBERGER.
ARTIFICIAL LEG.
No. 11,522. Reissued Jan. 28, 1896.
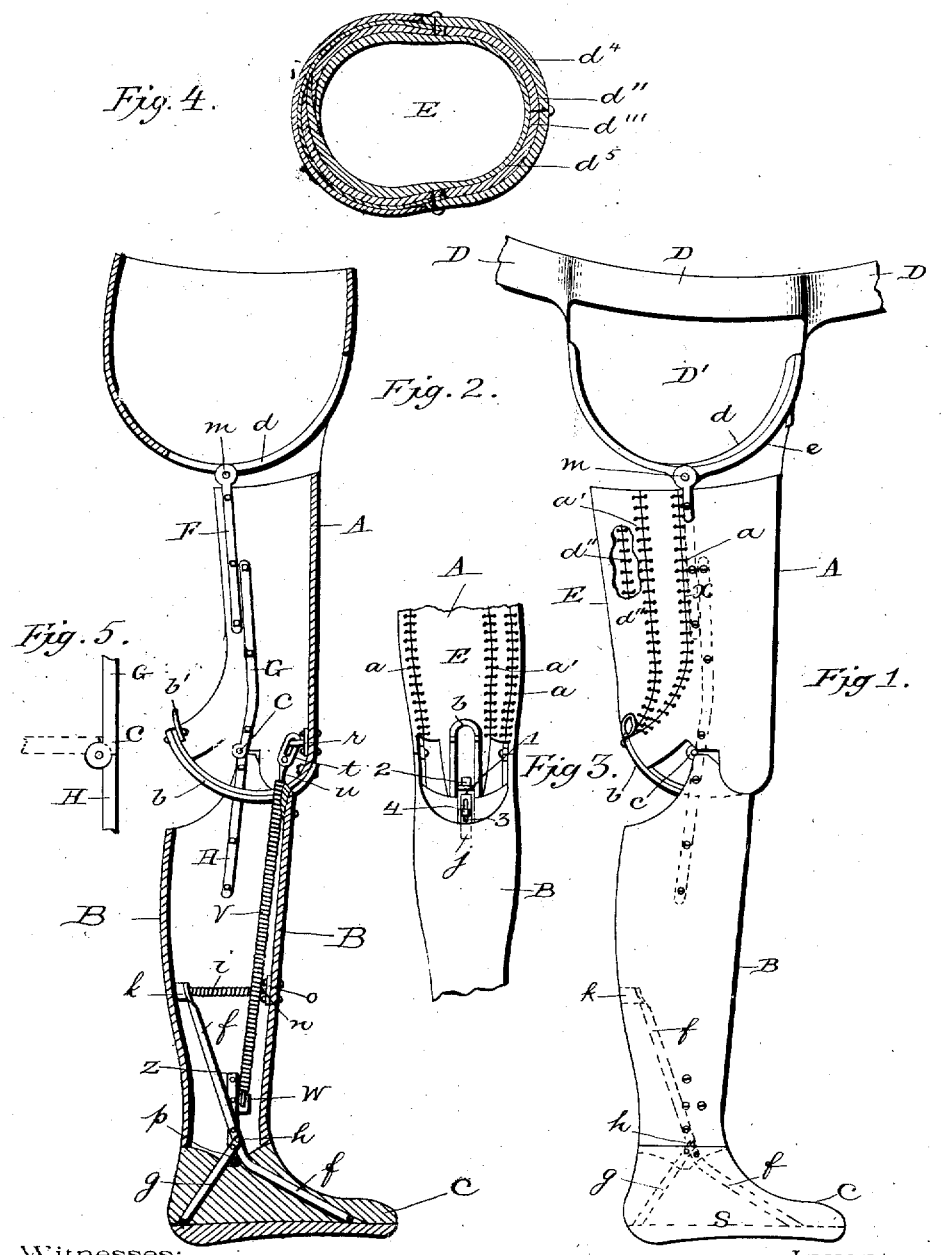
Witnesses:
Albert B. Blackwood
Carleton C. Snell
Inventor:
Daniel Hershberger
By J. H. Soule and Co.
Attorneys.

UNITED STATES PATENT OFFICE.

DANIEL HERSHBERGER, OF IDAVILLE, ASSIGNOR TO JOHN LARWAY, OF LOGANSPORT, INDIANA.

ARTIFICIAL LEG.

SPECIFICATION forming part of Reissued Letters Patent No. 11,522, dated January 28, 1896.

Original No. 514,225, dated February 6, 1894. Application for reissue filed October 18, 1894. Serial No. 526,318.

*To all whom it may concern:*

Be it known that I, DANIEL HERSHBERGER, a citizen of the United States, residing at Idaville, in the county of White and State of Indiana, have invented certain new and useful Improvements in Artificial Legs; and I do hereby declare the following to be a full, clear, and exact description of the invention, such as will enable others skilled in the art to which it appertains to make and use the same.

My invention relates to artificial legs; and it consists, first, in a housing or receptacle for the hip and buttock which is attached to the body and which is also made fast to the socket or upper section of the artificial leg supporting the same, and, secondly, in forming said socket or upper section of layers of leather or other suitable material, the edges of the layers being joined by lacings by which the area of the socket may be increased or diminished to fit the stump, and constituting the socket flexible and elastic as well as adjustable; also in other devices of mechanical construction, as will more fully appear.

In the drawings is illustrated an artificial leg of that class used by persons whose legs have been amputated above the knee.

Figure 1 is a side elevation of the leg, showing the hip-housing hinged to the stump-socket and the connection of the latter with the leg and foot below the knee. Fig. 2 is a vertical section of the same, showing the hinges, springs, and braces which operate the leg. Fig. 3 is a rear elevation of the leg, showing that portion immediately above and below the knee. Fig. 4 is a cross-section of the upper portion of the stump-socket, showing the layers of leather forming the inside portion of the same; and Fig. 5 is a side elevation of the stop joint or hinge used in the knee-joint.

In Fig. 1 A represents that portion of the leg between the hip and knee, and B that portion below the knee, including the foot.

D′ represents the hip-housing, which is attached below to the artificial leg, and which is to be secured to the body of the wearer, conforming more or less to the shape of the hip and buttock. This hip-housing may be of any suitable material and construction, it being only necessary that it should have sufficient rigidity in its own structure and in its connection with the artificial leg to furnish a firm support or seat for the body of the wearer at the hip, thus directly supporting the body upon the artificial leg and entirely relieving the stump of all strain and pressure due to sustaining the weight of the body and carrying the leg. As shown, the hip-housing is an open receptacle made of canvas or other suitable material having a metal framing *d e* concavo-convex in general form, to which the canvas or other material is attached, forming an opening of proper shape in the lower portion to allow the stump of the amputated leg to pass into the socket E. The hip-housing is also open at the top and one side to receive the lower portion of one side of the body, to which it is secured by a waistband D D D. The metal frame of the housing carries the eye of the hinge *m*, whereby the housing is hinged to the stump-socket A slightly in front of its vertical center, leaving a space between the two sufficient to allow a free swinging motion of the housing to accommodate the motion of the body relatively to the stump.

The metal frame of the housing D′ is made of two pieces *d* and *e*, the upper forward ends of which are overlapped and held together by being wrapped firmly by edges of the material which is turned under and secured to the same, which allows the space between the upper ends of *d* and *e* to be separated or brought nearer together, whereby the opening of the housing can be made to accommodate different dimensions.

A represents the case or shell of the socket, made of any light strong suitable material constituting the entire front and lower portion of the same. It is cut away at the line *x*, and the rear upper portion is made up in corresponding form of sheets of leather or other suitable flexible material, secured to the case or shell by lacings *a* which attach the outside sheet of the flexible material to the case or shell A. The succeeding layer *d′* is laced to its own opposite edge *a′*, and in the succeeding layers or sheets going toward the inner surface some of the edges of the sheets or layers are made with the edges beveled or shaved down thin, and others alternately and conforming to each other are provided with eyelets and lacings. In this manner a cylindrical socket or receptacle is formed, which is semi-flexible and semi-elastic, capable of adjustment in its caliber by the use of the lacings, durable and light. This flexible and elastic portion of the stump-socket can be extended downward toward the knee-joint as far as may be required to conform to the requirements of the stump on which it is to be applied.

The hinge *c* in Fig. 1 is a stop-hinge, as seen in Fig. 5, and allows a perfect knee action.

That portion of my improved leg below the knee is in the ordinary form, and the foot C is attached thereto and carries metallic bars *f* and *g*, the bar *f* being attached to metallic plate *s* at the ball of the foot, while the bar *g* is similarly attached at the heel. The bar *f* has an upward angular direction from the connection with the plate *s* to the ankle at *h*, where it is secured to the upper end of the bar *g* adjustably and is then continued upward to the inner surface of the case or shell forming the calf of the leg, where by means of a lug *k* it is connected with a horizontal coiled spring *i* working on a rod *n* which is secured to the case of the front of the leg by a lug *o*. The foot C is composed of cork or other suitable material and hinged to that portion of the leg below the knee at *p* on the ankle, Fig. 2. By this means a pressure on the heel forces the upper end of the bar *f* forward against the resisting force of the spring *i*, and as the weight is transferred to the ball of the foot in making a step the reaction of the spring *i* restores the foot to its original position.

In Fig. 2 a bracket *r* is secured to the inside surface of the stump-socket just above the knee, to which a link *t* is attached, the link *t* being pivoted to the upper end of a rod *u*, which supports a coiled spring *v*, the lower end of the rod *u* working vertically in a bracket *w*, which is attached to a vertical bar *z*, which is made fast to the inner surface of the case of the leg by screws, the heads of which are seen in Fig. 1.

In bending the knee by means of the hinge *c* the rod *u* is raised and the spring *v* compressed until carried past the center, when it is released and serves to hold the lower portion of the leg at a right angle with the upper part, yet allowing a free motion of the knee-joint, making it easy to lift the lower portion of the leg while walking by the action and reaction of the spring *v*.

The semicircular bars *b b* constitute the frame forming the bottom of the stump-socket, and the rod *u* passes between them as it moves forward and backward in bending the knee.

F is a vertical bar secured to the upper inside surface of the stump-socket by screws, the upper end terminating in an eye forming the hinge *m*, which permits movement between the hip-housing D′ and the stump-socket.

G H are the arms of the stop-hinge *c* and are secured to the inner surfaces of cases or shells A and B, one above and the other below the knee-joint which they form.

E represents that portion of the stump-socket which is composed of laminated flexible material, and its conformation is shown in Fig. 4, in which $d^4$ represents that part of the socket formed by the case or shell of the stump-socket, while $d''$, $d'''$, and $d^5$ represent layers or sheets of leather or other flexible material composing the inner and part of the outer surface.

In Fig. 3 *j* is a vertical bar attached to the inner front surface of the case or shell B, to which it is secured by a screw-bolt passing through the casing from the outside and into a slot 3 in said bar and fastened by a nut. This arrangement allows a vertical motion to the bar *j* controlled by the screw-bolt 4. The upper end of the bar *j* is provided with a cushioned stop 1, which impinges on bar 2 on the lower front edge of the shell A. The object of this stop 1 is to control the traverse of the lower section of the leg and foot, the forward motion being shortened as the bar *j* is raised.

Having thus fully described my said invention, what I claim as new, and desire to secure by Letters Patent, is—

1. In an artificial leg, a hip-housing constituting a seat or support which receives and embraces the buttock, said seat or support hinged to the thigh-socket and adapted to be secured to the body of the wearer, substantially as set forth.

2. In an artificial leg, a hip-housing adapted to the shape of the hip and buttock, the lower portion being provided with an opening to receive the stump, said opening having a curved metallic frame to which the material of the housing is secured, said metallic frame being pivoted to the stump-socket of the leg at the lower portion of the curve, the upper part of the housing provided with a waistband as set forth.

3. In an artificial leg, the combination of bars *f* and *g* connected at *h*, with the lug *k*, spring *i*, and rod *n*, constructed and operating in the manner and for the purpose as set forth and described.

4. In an artificial leg, a stump-socket composed of a cylindrical case of stiff material cut away on the back side and provided with an inner lining corresponding in form consisting of layers or sheets of leather or other flexible material, the edges of some of which overlap each other, while the edges of some other sheets are provided with eyelets and lacings, in the manner and for the purpose substantially as set forth and described.

In testimony whereof I affix my signature in presence of two witnesses.

DANIEL HERSHBERGER.

Witnesses:

GEO. W. WALTERS,

J. P. HETHERINGTON.